No. 745,627. PATENTED DEC. 1, 1903.
C. F. KANTLEHNER.
INSTRUMENT FOR TESTING EYES.
APPLICATION FILED JUNE 17, 1903.
NO MODEL. 2 SHEETS—SHEET 1.

WITNESSES
Geo. H. Graves
Jas. P. Barry

INVENTOR
CHRISTIAN·F·KANTLEHNER
BY James Whittemore
ATT'Y.

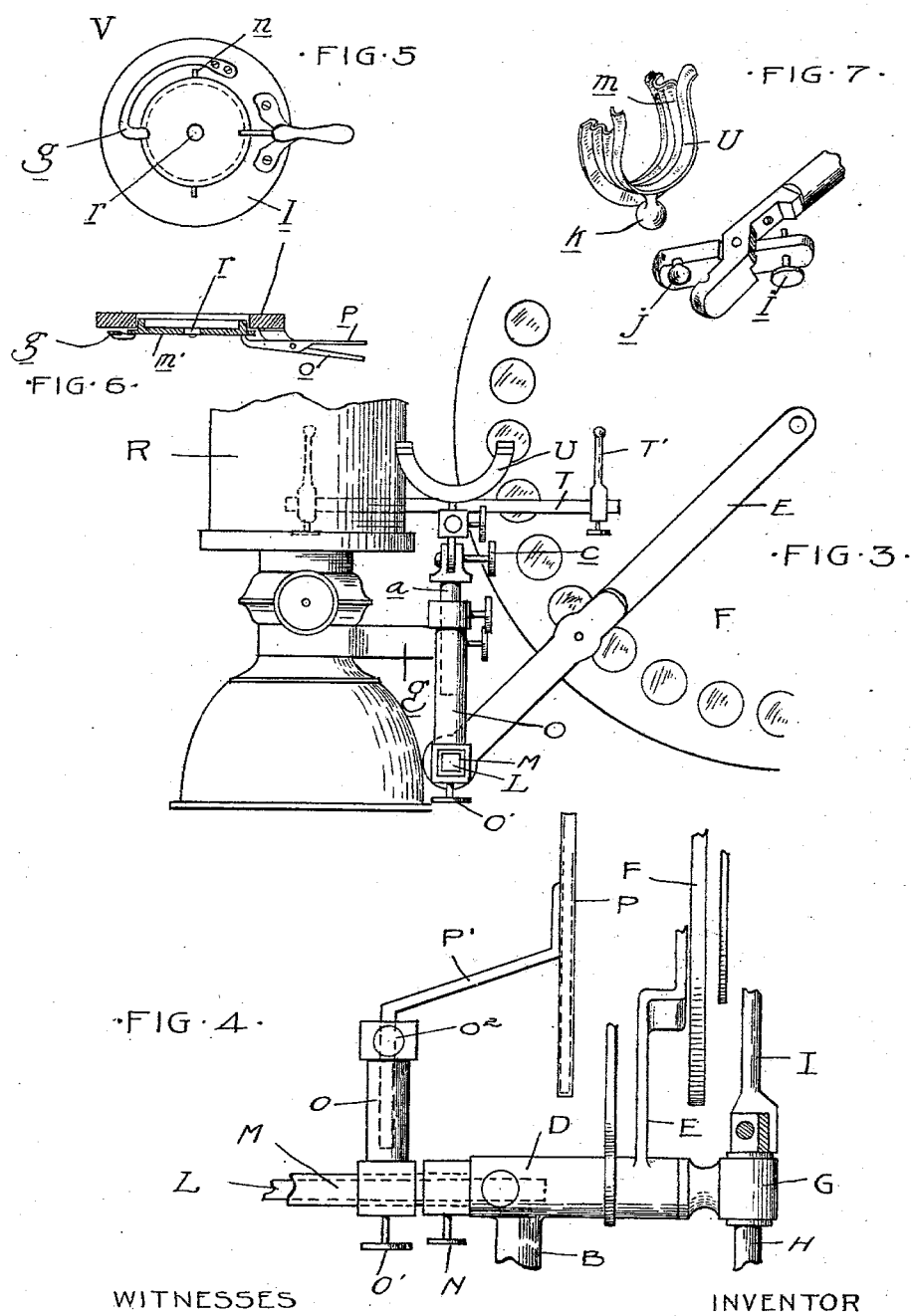

No. 745,627. Patented December 1, 1903.

UNITED STATES PATENT OFFICE.

CHRISTIAN F. KANTLEHNER, OF CHELSEA, MICHIGAN.

INSTRUMENT FOR TESTING EYES.

SPECIFICATION forming part of Letters Patent No. 745,627, dated December 1, 1903.

Application filed June 17, 1903. Serial No. 161,835. (No model.)

*To all whom it may concern:*

Be it known that I, CHRISTIAN F. KANTLEHNER, a citizen of the United States, residing at Chelsea, in the county of Washtenaw and State of Michigan, have invented certain new and useful Improvements in Instruments for Testing Eyes, of which the following is a specification, reference being had therein to the accompanying drawings.

The invention relates to optical instruments especially designed for use in the testing of eyes, either for the fitting of glasses or for any other purpose.

It is the object of the present invention to obtain an instrument which is not only adapted for the usual refractive tests made by the optician, but is also capable of being converted into either an ophthalmoscope or a retinoscope.

It is a further object to obtain a construction in which the instrument may be adjusted for all of its various uses without changing the position of the patient whose eyes are being tested.

The invention consists in the combination with a refractive test instrument comprising a head-rest, an adjustable lens-holder carrying a series of graded lenses and eye-orifices with which said lenses may be registered and of an attachment for making ophthalmoscopic and retinoscopic tests.

The invention further consists in the peculiar construction of this attachment, and, further, in the peculiar construction, arrangement, and combination of parts of the instrument, as hereinafter described and claimed.

Figure 1:
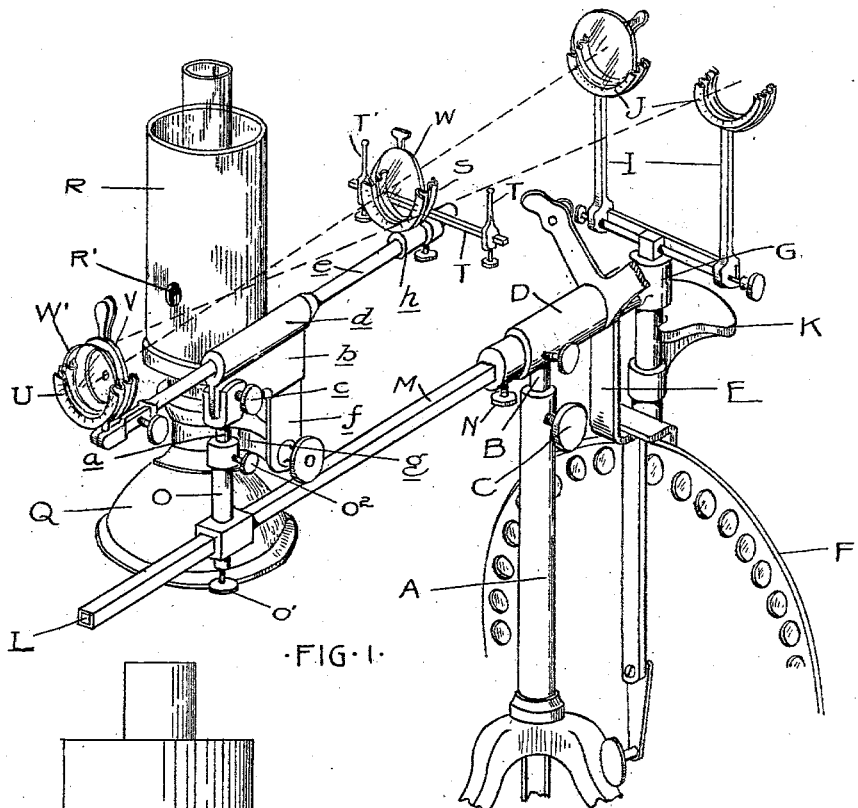
Figure 2:
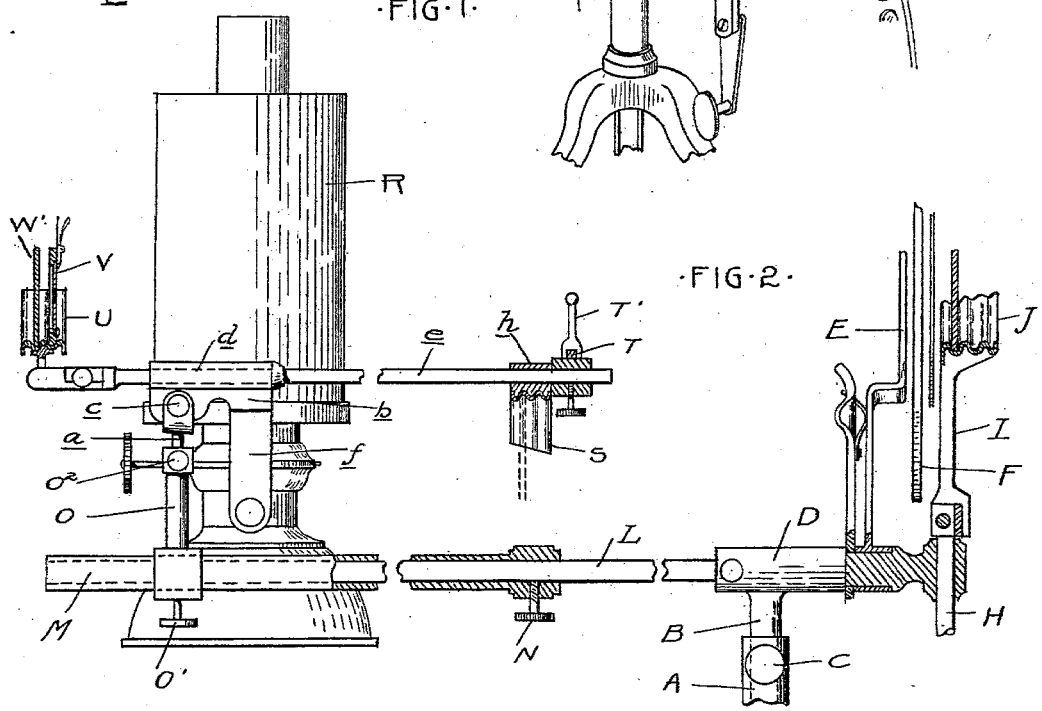

In the drawings, Figure 1 is a perspective view of the instrument arranged for use as an ophthalmoscope. Fig. 2 is a sectional side elevation of the instrument as adjusted for use as a retinoscope. Fig. 3 is a front elevation of Fig. 2. Fig. 4 shows an adjustment of the instrument for the ordinary reading test. Fig. 5 is an elevation, and Fig. 6 a section through the vibratory mirror employed in the retinoscope and also forming a part of the ophthalmoscope. Fig. 7 is a perspective view of the holder for this mirror, together with the universal-jointed connection for supporting the same on the instrument.

A is a suitable standard, preferably provided with a vertical extension B, secured in different positions of adjustment by suitable means, such as the clamping-screw C.

D is a T-shaped head at the upper end of the extension B, at the forward end of which is pivotally secured the swinging arm E, carrying the rotary lens-holder F.

G is a socket secured to the standard in front of the arm E and adapted to receive the shank H of the detachable trial-frame I. The latter is provided with two laterally-adjustable lens-holders J, which may be positioned in registration with the eyes of the patient, whose chin is supported on the shelf K, connected to the socket G.

The instrument thus generally described has been heretofore used and forms no part of the present invention, excepting as will be hereinafter set forth. This instrument may be employed in making the ordinary test for determining the strength of lenses needed by the patient, this being accomplished by first swinging the arm E into a position where the lenses in the holder F may be successfully registered with one of the lens-holders J of the trial-frame. The tests are then made for the one eye, after which the arm E is swung to register the lenses with the other lens-holder J, and the tests are repeated for the opposite eye. Corresponding lenses may then be placed in the holders J and the trial-frame detached to be used by the patient.

It will be understood from the description as thus far given that both eyes of the patient may be tested without change of position. The attachments which will now be described are also adapted for use in testing either eye without changing the position of the patient, the construction being as follows:

L is a shank secured to the head D and projecting horizontally and rearwardly therefrom.

M is a tubular extension of the shank L, which telescopiclly engages with the latter and is secured in different positions of adjustment by a set-screw N.

O is an arm or post the lower end of which is sleeved upon the member M and is detachably secured in position thereon by the said screw O'. This post is preferably socketed at its upper end to receive different adjustments, being secured in position by the set-screw O².

For the usual reading test a card-holder P is employed, which is secured to an arm P', having a shank adapted to engage with the socket in the post O. In order that this holder P may be adjusted in close proximity to the rotary lens-holder F, the arm P' inclines forward from its securing-shank, as shown in Fig. 4. The post O also serves for securing the attachment for the opthalmoscope and retinoscope. This attachment comprises the shank $a$ for engaging the socket, to which is secured the arm $b$ by means of the clamping-screw $c$. The arm $b$ is provided with the horizontally-extending socket portion $d$, with which a rod $e$ engages, and the downwardly-extending portion $f$, having the laterally-extending arm $g$, forming a support for the lamp Q. This lamp may be of any suitable construction, but as shown consists in an oil-lamp provided with the opaque chimney R, having the aperture R' therein, through which a ray of light from the lamp is directed against the mirror, as hereinafter described.

S is a lens-holder secured to the forward end of the rod or arm $e$. This holder is secured by means of a sleeve $h$, which permits of turning the holder downward in the position shown in Fig. 2 when it is not needed for use.

T is a cross-bar also at the forward end of the rod $e$ and having adjustably secured thereon the fingers T', which are used for directing the sight of the patient.

U is a holder at the rear end of the rod $e$, which is adapted to receive the mirror V for use in the opthalmoscope and retinoscope tests. The holder U is secured to the arm $e$ by a clamp $i$, which is provided with a socket $j$ for receiving a spherical shank $k$ on said holder, thus permitting of adjusting the latter to various angles.

The mirror V comprises an annular frame $l$, adapted to fit within the grooves $m$ of the holder U.

$m'$ is the mirror proper, which is pivoted at $n$ to the frame $l$.

$o$ is a handle rigidly secured to the frame $l$, and $p$ is a lever fulcrumed to the handle $o$ and engaging with the mirror $m'$.

$q$ is a spring for moving the mirror in the opposite direction from the movement imparted by the lever $p$. The mirror $m'$ has the central transparent portion $r$ forming the sight-orifices for the operator.

With the construction just described when the mirror V is placed in the holder U the handle P may be turned to extend at any angle and in every position of adjustment, and the mirror may be vibrated by operating the lever $p$.

The instrument being constructed as described, the operation is as follows: The ordinary refractive tests are made in the manner already described by successfully registering the lenses in the carrier F with either one of the lens-holders J until the proper strength of lens is determined. A corresponding lens or lenses may then be placed in the holder and the test repeated for the other eye. The ophthalmoscopic test is performed by placing a suitable lens, such as W, in the holder S, the mirror V in the holder U, and also a lens W' on rear of the mirror. The post O is then positioned upon the shank M so as to arrange the parts carried by the shank $a$ a proper distance from the lens-holder J of the trial-frame. The rod $e$ may then be adjusted so as to aline the mirror V and lens W with one of the holders J. This alinement may be secured by swinging the arm $e$ laterally, the shank $a$ swiveling in the socket of the post O, and the angle of the rod $e$ may also be adjusted by the pivotal connection formed at the clamping-screw $c$. Thus a proper alinement of the mirror V, lens W, and holder J may be secured. In performing the test the light passing through the orifices R' in the opaque chimney R will fall upon the mirror V and will be reflected thereby through the lens W and through the orifices in the lens-holder J into the eye of the patient. The light will then be reflected from the eye and returned through the lens W, the sight-hole of the mirror, and the lens W', the latter serving to bring it to a focus. The use of a focusing-lens arranged in rear of the mirror and sight-hole I believe to be new in instruments of this character. Thus the operator by placing his eye back of the lens W' is enabled to examine the fundus of the eye. The same test may be performed for the other eye of the patient by merely changing the angle of the rod $e$ so as to properly aline the mirror V and lens W therewith, as indicated in dotted lines in Fig. 1.

For the retinoscopic test the mirror must be adjusted a greater distance from the trial-frame, and to this end the extension M of the shank L is moved downward and secured in proper position by the set-screw N. The lens W' is removed and may for convenience be placed in the holder S adjacent to the other lens, after which said lens-holder S is then turned downward to be out of the way, and the rod $e$ is adjusted in angle so the light reflected from the mirror will be directed to one of the lens-holders J. The operator may now take his position with his eye at the sight-orifices $r$, and then by turning the frame $l$ in the holder U he may shift the axis of the mirror $m'$ to extend at different angles and at each position of adjustment can vibrate the mirror by operating the lever $p$. This may be accomplished by grasping the handles $o$ and lever $p$ between the thumb and finger, so that both the frame $l$ may be adjusted and the mirror tilted. In connection with this test it is necessary to interpose lenses of various strength in front of the eye, and this may be performed by setting the arm $e$ so that the lenses in the carrier F may be successively registered with the lens-holder J.

From this brief description of the operation it will be understood how a number of tests may be made; but it is obvious that the instrument is capable for use in other tests not specifically referred to.

What I claim as my invention is—

1. In an instrument for testing eyes, the combination with the frame having a head-support, an eye-frame for positioning the eye of the patient, of an ophthalmoscopic mirror carried by said frame at the forward end thereof, a focusing-lens arranged at the rear of said mirror, and means for adjusting said mirror in relative position on said frame for both the ophthalmoscopic and retinoscopic tests.

2. In an instrument for testing eyes, the combination with the frame having a head-support and eye-frames for both eyes of the patient, of an ophthalmoscopic mirror carried by said frame, a focusing-lens arranged to swing laterally, in the rear of said mirror, and means for adjusting said mirror on said frame into positions for both the ophthalmoscopic and retinoscopic tests and in relation to either eye of the patient.

3. In an instrument for testing eyes, the combination with a frame having a head-support and eye-frames for positioning both eyes of the patient, of a member adjustably supported upon said frame and an ophthalmoscopic mirror, a retinoscopic lens, and a lamp supported by said member and adapted to be carried thereby into positions of both the ophthalmoscopic and retinoscopic tests.

4. In an instrument for testing eyes, the combination with a standard of a detachable trial-frame supported thereby and a chin-rest for supporting the head of the patient with the eyes in proper relation to said trial-frame, a shank extending rearward from this standard, a member adjustably secured to said shank and devices for ophthalmoscopic and retinoscopic tests secured to said member and adapted to be carried thereby into proper operative relation to said trial-frame, one of said devices being mounted to move laterally into and out of line with the other.

5. In an instrument for testing eyes, the combination with a standard of a detachable trial-frame carried thereby and having eye-frames for both eyes of the patient, a revoluble lens-holder having a circumferential series of graded lenses and means for adjusting said holder into positions for successively registering the lenses with either of the eye-frames, a shank extending rearward from said standard and ophthalmoscopic and retinoscopic attachments adjustably secured upon said shank, one of said attachments being mounted to move laterally into and out of line with the other.

6. In an instrument for testing eyes, the combination with a frame provided with means for positioning the eyes of the patient in relation thereto, of a shank extending rearward from said frame, a post adjustably secured to said shank, a member having a universal clamping-joint with said post, a lamp carried thereby, an ophthalmoscopic mirror also carried by said mirror and an intermediate lens secured to said member, said universal clamping-joint permitting of alining said mirror and intermediate lens with either eye of the patient.

7. In an instrument for testing eyes, the combination with a frame provided with means for positioning the eyes of the patient in relation thereto, of a rearwardly-projecting extensible shank for said frame and ophthalmoscopic and retinoscopic attachments secured to said extensible shank and adapted to be positioned in proper relation to the eyes of the patient, one of said attachments being movable laterally, whereby either may be brought into operative position.

8. In an instrument for testing eyes, the combination with a frame provided with means for positioning the eyes of the patient in relation thereto, of an extensible shank projecting rearward from said frame, a member adjustably secured to said shank carrying a lamp, an ophthalmoscopic mirror and an intermediate lens-holder, said lens-holder being adapted to be swung in or out of alinement with said mirror and the eye to be tested, whereby either an ophthalmoscopic or retinoscopic test may made.

9. In an instrument for testing eyes, the combination with a frame having means for positioning the eyes of the patient in relation thereto, a rearwardly-extending shank on said frame, a member adjustably secured to said shank carrying a lamp and an ophthalmoscopic mirror a cross-bar on said member and a sight adjustably secured to said cross-bar and arranged intermediate said mirror and the eyes of the patient.

10. In an instrument for testing eyes, the combination with a frame provided with means for positioning the eyes of the patient in relation thereto, of a rearwardly-extending shank on said frame, a post adjustably secured to said shank, a member secured to said post and having a longitudinally-extending rod, an ophthalmoscopic mirror having a universally-jointed clamping connection with one end of said rod, a lens-holder swiveled to the opposite end of said rod whereby the same may swing laterally into and out of line with said ophthalmoscopic mirror, and a lamp having an intermediate supporting connection with said member.

11. In a retinoscope, a mirror comprising an annular frame, the mirror proper pivoted in said annular frame, a finger-piece rigidly secured to said annular frame for imparting rotary movement thereto, and projecting radially therefrom, a lever fulcrumed to said finger-piece and bearing against said mirror, a spring bearing against the opposite side of said mirror for imparting a movement opposite to that imparted by the lever, and a holder with which said annular frame has a revoluble engagement whereby the axis of said mirror may be rotated and whereby the mirror may be vibrated by grasping said handle and lever between the thumb and finger of the operator.

In testimony whereof I affix my signature in presence of two witnesses.

CHRISTIAN F. KANTLEHNER.

Witnesses:
H. C. SMITH,
JAS. P. BARRY.